(12) United States Patent
Furukawa et al.

(10) Patent No.: US 10,081,280 B2
(45) Date of Patent: Sep. 25, 2018

(54) VEHICLE SEAT

(71) Applicant: TOYOTA BOSHOKU KABUSHIKI KAISHA, Aichi (JP)

(72) Inventors: Kenji Furukawa, Aichi (JP); Yoshihiro Motoi, Aichi (JP); Shohei Funaki, Aichi (JP)

(73) Assignee: TOYOTA BOSHOKU KABUSHIKI KAISHA, Acihi (JP)

( * ) Notice: Subject to any disclaimer, the term of this patent is extended or adjusted under 35 U.S.C. 154(b) by 0 days.

(21) Appl. No.: 15/822,558

(22) Filed: Nov. 27, 2017

(65) Prior Publication Data
US 2018/0170226 A1   Jun. 21, 2018

(30) Foreign Application Priority Data

Dec. 21, 2016   (JP) .................................. 2016-248084

(51) Int. Cl.
*B60N 2/68*   (2006.01)
*B60N 2/64*   (2006.01)
*B60N 2/22*   (2006.01)

(52) U.S. Cl.
CPC ................. *B60N 2/68* (2013.01); *B60N 2/22* (2013.01); *B60N 2/64* (2013.01)

(58) Field of Classification Search
CPC .................................. B60N 2/68; B60N 2/682
See application file for complete search history.

(56) References Cited

U.S. PATENT DOCUMENTS

| | | | | |
|---|---|---|---|---|
| 6,761,412 | B1* | 7/2004 | Garnweidner | B60N 2/68 297/452.18 |
| 2003/0038524 | A1* | 2/2003 | Bruck | A47C 7/40 297/452.18 |
| 2005/0077763 | A1* | 4/2005 | Kawashima | B60N 2/42745 297/216.14 |
| 2005/0200184 | A1* | 9/2005 | Siegrist | B60N 2/20 297/374 |
| 2011/0210592 | A1* | 9/2011 | Watanabe | B60N 2/22 297/354.1 |
| 2012/0169103 | A1* | 7/2012 | Renault | B60N 2/22 297/354.12 |
| 2013/0140868 | A1* | 6/2013 | Muck | B23K 26/24 297/452.2 |

(Continued)

FOREIGN PATENT DOCUMENTS

JP   2002-283892   10/2002

*Primary Examiner* — Timothy J Brindley
(74) *Attorney, Agent, or Firm* — Greenblum & Bernstein, P.L.C.

(57) ABSTRACT

A vehicle seat that can reduce the mass of a side frame without significantly reducing the mechanical strength of the side frame is provided. The vehicle seat comprises a back frame that comprises a side frame that extends substantially vertically, and a recliner that is coupled to a lower end of the side frame and configured so that the back frame is pivotable. The side frame comprises a side frame body that comprises a closed cross-section portion and extends from an upper end of the side frame to the recliner, and a reinforcing member that extends to the recliner from a point between a first and a second end of the side frame body along an extension axis of the side frame body and is fixed to the side frame body with at least a part of the reinforcing member being inserted into the closed cross-section portion.

12 Claims, 9 Drawing Sheets

(56) References Cited

U.S. PATENT DOCUMENTS

| | | | | |
|---|---|---|---|---|
| 2013/0221725 A1* | 8/2013 | Yamada | ............ | B60N 2/682 |
| | | | | 297/452.18 |
| 2014/0232162 A1* | 8/2014 | Mitsuhashi | ............ | B60N 2/68 |
| | | | | 297/452.18 |
| 2016/0347223 A1* | 12/2016 | Akaike | ............ | B60N 2/682 |
| 2017/0015220 A1* | 1/2017 | Albert Reginold | .... | B60N 2/682 |
| 2017/0197533 A1* | 7/2017 | Schlitt | ............ | B60N 2/20 |
| 2017/0313226 A1* | 11/2017 | Akaike | ............ | B60N 2/682 |
| 2018/0050618 A1* | 2/2018 | Schanderl | ............ | B60N 2/682 |

\* cited by examiner

VEHICLE SEAT

CROSS-REFERENCE TO RELATED APPLICATIONS

This application claims the benefit of Japanese Patent Application No. 2016-248084 filed Dec. 21, 2016 in the Japan Patent Office, the entire disclosure of which is incorporated herein by reference.

BACKGROUND

The present disclosure relates to a seat that is used in automobiles, railway vehicles, vessels, aircrafts, and other vehicles.

For example, a side frame that is used in a back frame for a vehicle seat disclosed in Japanese Unexamined Patent Application Publication No. 2002-283892 comprises a tower frame having a rectangular closed cross-section, in which an insert brace is disposed as a reinforcing member.

A back frame is a frame to support the back of the occupant and configures a seatback together with other components such as a back cushion. A side frame is a tower-like frame that extends substantially vertically in an end of the back frame along the width axis of the seat.

SUMMARY

In the aforementioned publication, the reinforcing member of the side frame extends across the entire length of the tower frame. This increases the mass of the side frame.

It is therefore preferable that one aspect of the present disclosure is a vehicle seat that can reduce the mass of a side frame without significantly reducing the mechanical strength of the side frame.

One aspect of the present disclosure is a vehicle seat. The vehicle seat comprises a back frame, and a recliner. The back frame comprises a side frame that extends substantially vertically. The recliner is coupled to a lower end of the side frame and configured so that the back frame is pivotable. The side frame comprises a side frame body, and a reinforcing member. The side frame body comprises a closed cross-section portion and extends from an upper end of the side frame to the recliner. The reinforcing member extends to the recliner from a point between a first and a second end of the side frame body along an extension axis of the side frame body, and the reinforcing member being fixed to the side frame body with at least a part of the reinforcing member being inserted into the closed cross-section portion.

A force acting on a side frame such as a bending moment is greatest at the lower end of the side frame, which is the root of the side frame, in other words, near the recliner. Therefore, if the mechanical strength required (hereinafter referred to as the required strength) near the recliner can be satisfied, the required strength of the entire side frame can also be satisfied.

Since the reinforcing member according to the present disclosure extends to the recliner from a point (hereinafter referred to as the intermediate point) between the first and the second end of the side frame body along the extension axis of the side frame body, mass of the side frame can be reduced without significantly reducing the mechanical strength of the side frame.

To be more specific, the mechanical strength of the side frame near the recliner is a combined strength of the side frame body and the reinforcing member. In contrast, in a hypothetical structure (hereinafter also referred to as the bonded frame) that needs to satisfy the mechanical strength near the recliner solely with a reinforcing member, the reinforcing member and a side frame body cannot be effectively utilized and thus the mass reduction of a side frame is not easily achieved.

To be more specific, the side frame body of the bonded frame extends from the upper end to an intermediate point on the side frame and is bonded to the reinforcing member at this intermediate point. The bonded frame therefore needs to satisfy the required strength near the recliner solely with the reinforcing member. In addition, since the reinforcing member and the side frame body overlap with each other in their bonded area, the mechanical strength at this bonded area becomes greater than required.

To satisfy the bonding strength, the reinforcing member and the side frame body each need an area (hereinafter referred to as the bonding margin) to allow for overlap. The mechanical strength at the bonding margins accordingly becomes greater than required. As a consequence, the reinforcing member and the side frame body cannot be effectively utilized; the mass reduction of a side frame is thus not easily achieved.

If the reinforcing member is disposed outside the side frame body in the bonded frame, it is likely to cause a large stress concentration in an area of the side frame body abutting the end of the reinforcing member.

However, if at least a part of the reinforcing member is inserted into the closed cross-section portion as provided in the present disclosure, an occurrence of a large stress concentration is less likely than in the bonded frame, in which the reinforcing member is disposed outside the side frame body.

As it has been described above, the present disclosure can provide a vehicle seat that can reduce the mass of the side frame without significantly reducing the mechanical strength of the side frame.

The aforementioned intermediate point on the side frame body does not only include the midpoint on the side frame body along its longitudinal axis, which is at half the length of the side frame body along its longitudinal axis. The intermediate point of the side frame body also includes any points situated off the midpoint in addition to the midpoint on the side frame body along its longitudinal axis.

The present disclosure may be configured as described below.

That is, the reinforcing member, the side frame body, and the recliner may preferably be fixed together.

According to this configuration, the reinforcing member, the side frame body, and the recliner are fixed together in an area of the side frame, at which a force acting on the side frame such as a bending moment is greatest, in other words, near the recliner. The mechanical strength of the side frame can therefore be increased.

The reinforcing member, the side frame body, and the recliner may be integrated by welding. An insert portion, which is a part of the reinforcing member that is inserted into the closed cross-section portion, may comprise a contact portion that is in contact with a face plate portion of the closed cross-section portion, and a non-contact portion that is spaced apart from the face plate portion. This configuration can help reduce the mass of the reinforcing member.

In a hypothetical configuration where the reinforcing member is fixed on the outside of the side frame body, outer dimensions of the reinforcing member are limited by the outer dimensions of the side frame body. It is therefore difficult to reduce the size and thus the mass of the reinforcing member.

The insert portion, which is a part of the reinforcing member that is inserted into the closed cross-section portion, may comprises a contact portion that is in contact with the face plate portion of the closed cross-section portion, and a flange that has a shape of a wall and protrudes from the contact portion. This configuration can help reduce the mass of the reinforcing member and increase rigidity of the reinforcing member at the same time.

The present disclosure may comprise a beam member that extends along the width axis of the vehicle seat and penetrates the side frame body and an upper end of the reinforcing member. This enables the upper end of the reinforcing member to be firmly coupled to the side frame body.

BRIEF DESCRIPTION OF THE DRAWINGS

An example embodiment of the present disclosure will be described hereinafter with reference to the accompanying drawings, in which.

DETAILED DESCRIPTION OF THE PREFERRED EMBODIMENTS

Figure 1:
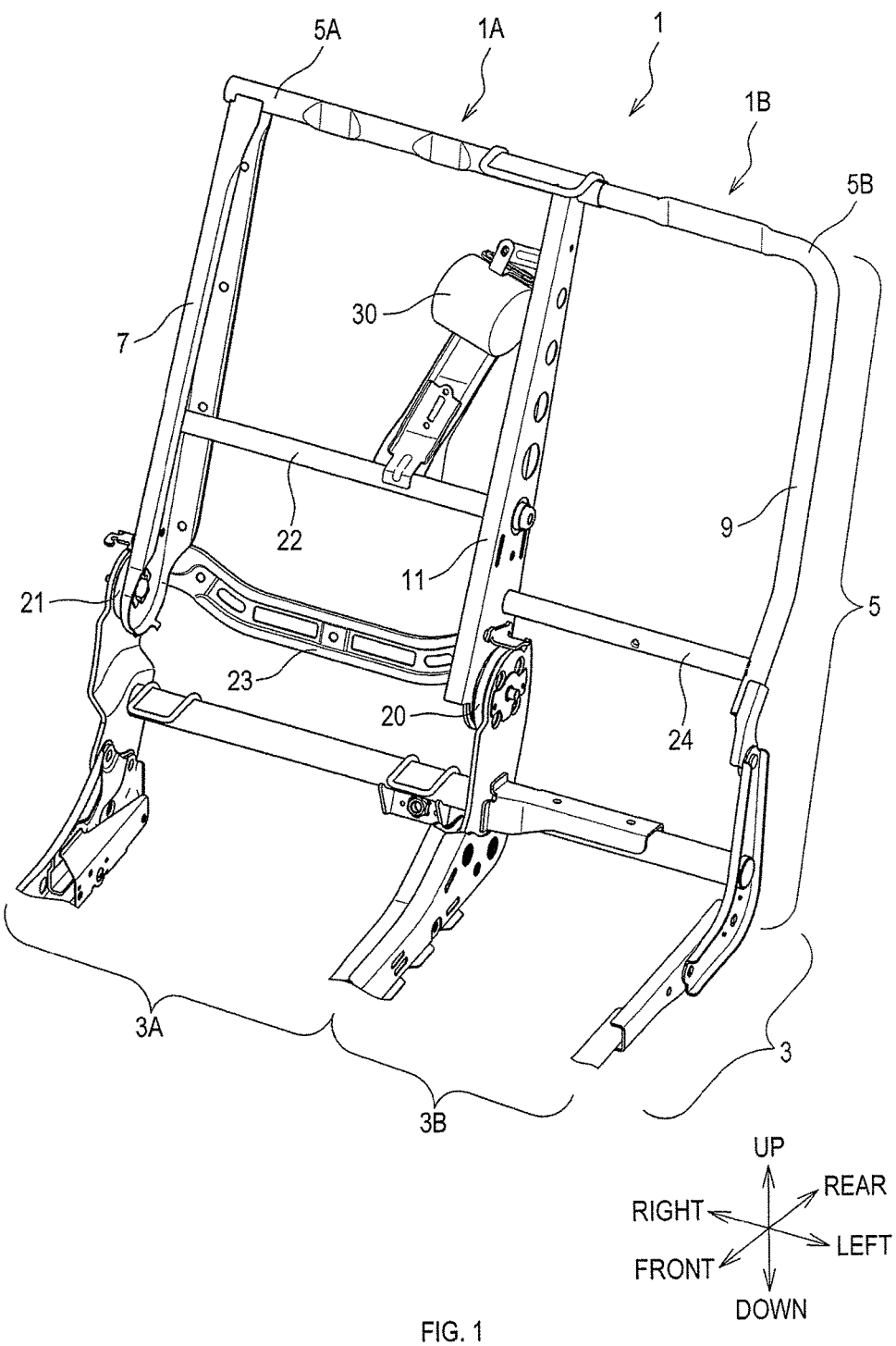
FIG. 1 is a diagram showing a frame structure of a vehicle seat according to a first embodiment.

An "embodiment" explained hereinafter shows one example of embodiments that belong to the technical scope of the present disclosure. In other words, matters to specify the invention recited in the claims are not limited to specific configurations or structures that are shown in the embodiments explained hereinafter.

Arrows and other marks that indicate directions on each drawing are made for easy understanding of relationship between each drawing. Arrows and other marks (directions) labelled on each drawing do not limit the scope of the present disclosure.

At least in respect of a member or portion that is labeled with a reference numeral for explanations, there is at least one in number of such a member or portion.

First Embodiment

In the present embodiment, a rear seat of a passenger car will be explained. As shown in FIG. 1, a vehicle seat 1 for the rear seat comprises a side seat 1A, and a center seat 1B in the present embodiment.

The side seat 1A is a first portion of the vehicle seat 1 situated on a first side (the right side in the present embodiment) of the vehicle seat 1 along the width axis of the vehicle. The center seat 1B is a second portion of the vehicle seat 1 adjacent to the side seat 1A.

The frame part of the side seat 1A and the frame part of the center seat 1B are integrated with each other. In the explanations hereinafter, directions are defined in relation to a vehicle seat of the present embodiment that is assembled to a vehicle.

1. Outline of Vehicle Seat

Figure 2:
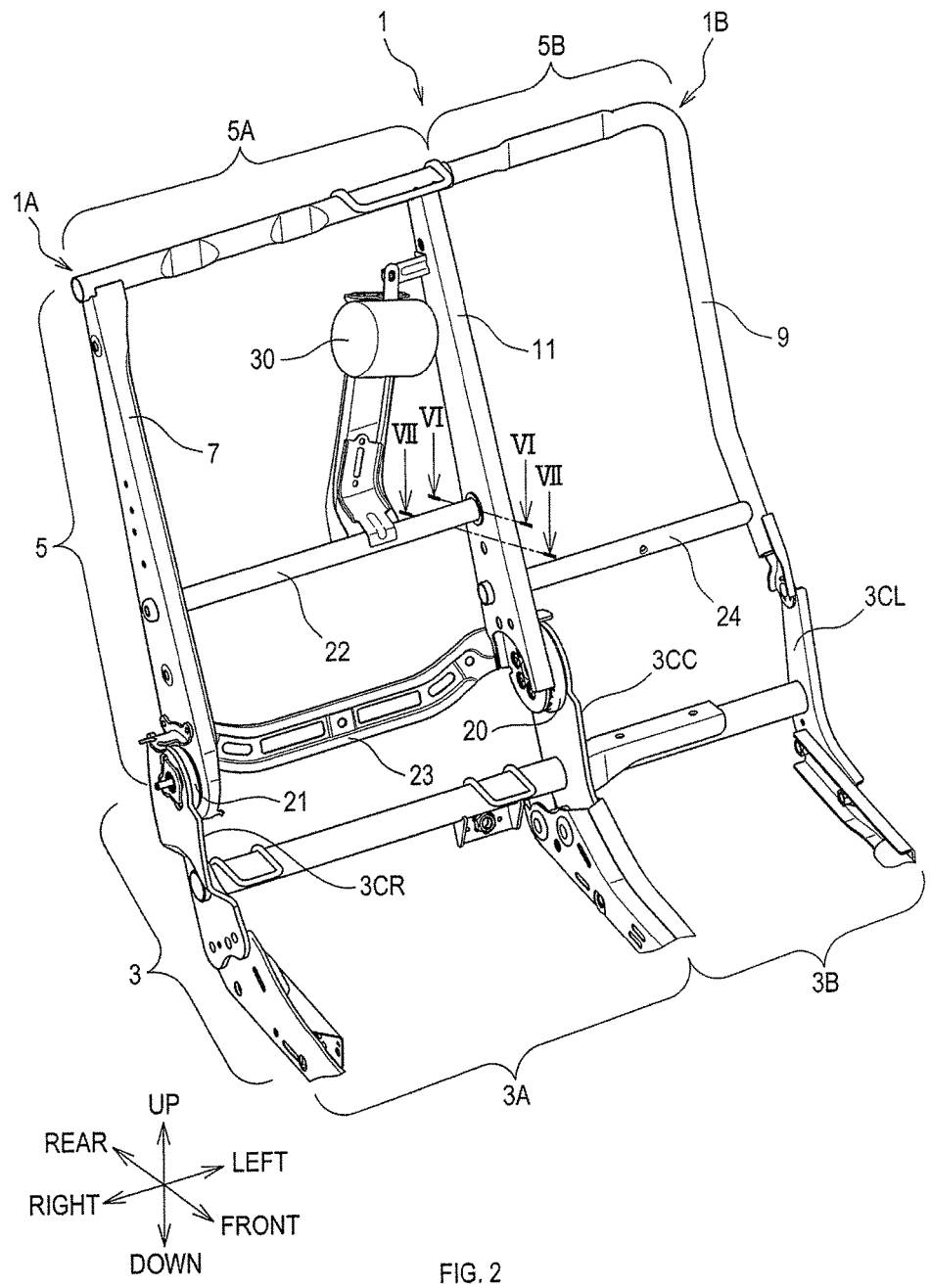
FIG. 2 is a diagram showing a frame structure of the vehicle seat according to the first embodiment.

As shown in FIG. 2, the frame structure of the vehicle seat 1 comprises a cushion frame 3, and a back frame 5. The cushion frame 3 is a frame to support the buttocks of an occupant. The back frame 5 is a frame to support the back of the occupant.

The cushion frame 3 according to the present embodiment comprises the right cushion frame member 3A for the side seat 1A and the left cushion frame member 3B for the center seat 1B that are integrated with each other.

Similarly, the back frame 5 comprises the right back frame member 5A for the side seat 1A and the left back frame member 5B for the center seat 1B that are integrated with each other. The back frame 5 according to the present embodiment comprises at least side frames 7, 9, and 11 (right side frame 7, left side frame 9, and center side frame 11) that are tower-like frames and extend substantially vertically.

The two side frames 7 and 9 are separately disposed in each end of the back frame 5 (seat-width end) along the width axis of the vehicle seat 1 (seat-width axis). More specifically, the right side frame 7 is disposed in a first seat-width end of the right back frame member 5A; the left side frame 9 is disposed in the second seat-width end of the left back frame member 5B.

The seat-width axis in the present embodiment is consistent with the width axis of the vehicle (right-left directions). Thus, the right side frame 7 is disposed in the right side of the right back frame member 5A; the left side frame 9 is disposed in the left side of the left back frame member 5B.

The center side frame 11 supports a back cushion (not shown) of the side seat 1A and a back cushion (not shown) of the center seat 1B.

Detailed structure of the center side frame 11 will be explained later. Each of the side frames 7, 9, and 11, in other words, the back frame 5 is coupled to the cushion frame 3 so as to be pivotable (reclinable) relative to the cushion frame 3.

The two side frames 7 and 11 that form the right back frame member 5A are each coupled to the cushion frame 3, more specifically to the right cushion frame member 3A, at the lower end of each of the two side frames 7 and 11 respectively via the recliners 20 and 21 (center recliner 20 and right recliner 21).

Each of the recliners 20 and 21 at least comprises a function to switch the mode of the back frame 5 relative to the cushion frame 3 between pivotable mode and non-pivotable mode. The recliners 20 and 21 according to the present embodiment are manual recliners.

The left side frame 9 in the left back frame member 5B is coupled to the cushion frame 3 (through the side frames), more specifically to the left cushion frame member 3B, at the lower end of the left side frame 9. The left side frame 9 according to the present embodiment is pivotably coupled to the left side of the left cushion frame member 3B without the intermediary of a recliner.

A right reinforcing beam 22 is disposed across the side frames 7 and 11 at an intermediate point on each of the two side frames 7 and 11 along their extension axes. The right reinforcing beam 22 extends along the seat-width axis and couples the right side frame 7 to the center side frame 11. A lower panel 23 couples the lower end of the right side frame 7 to the lower end of the center side frame 11.

The intermediate point on each of the side frames 7 and 11 along their extension axes is any point between the first end (upper end) and the second end (lower end) of each of the side frames 7 and 11 along their extension axes. The intermediate point may be, but is not limited to the midpoint (the point at half the length) of each of the side frames 7 and 11 along their extension axes.

Each of the three side frames 7, 11, and 9 according to the present embodiment is coupled to the cushion frame 3 via lower arms 3C (right lower arm 3CR, center lower arm 3CC, and left lower arm 3CL). The lower arms 3C are fixed such that the lower end of the lower arms 3C are coupled to the cushion frame 3, and the upper end of the right lower arm 3CR is coupled to the right recliner 21. The upper end of the center lower arm 3CC is coupled to the center recliner 20.

A left reinforcing beam 24 is disposed across the two side frames 9 and 11 at a point that is situated between the first end (upper end) and the second end (lower end) of each of the side frames 9 and 11 along their extension axes and lower than the right reinforcing beam 22. The left reinforcing beam 24 extends along the seat-width axis and couples the left side frame 9 to the center side frame 11.

The right reinforcing beam 22 is coupled to a retractor 30 that serves to retract a seatbelt for the center seat 1B. The load caused by a tensile force acting on the seatbelt is thus transmitted to the two side frames 9 and 11 via the right reinforcing beam 22.

2. Structure of Center Side Frame 11

2.1 Outline of Center Side Frame 11

Figure 3:
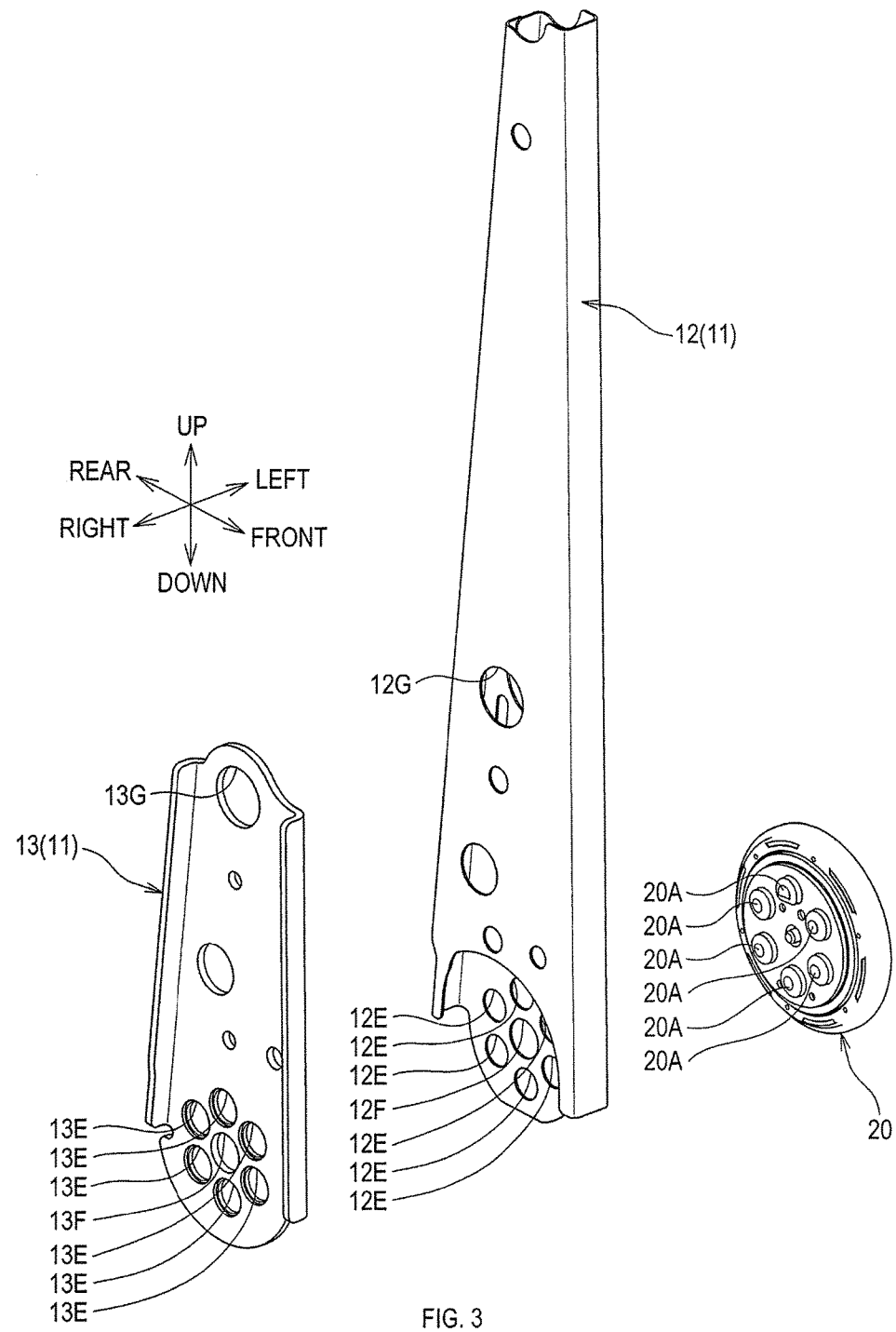
FIG. 3 is an exploded perspective view of a side frame according to the first embodiment.

FIG. 3 shows that the center side frame 11 comprises the side frame body 12, and the reinforcing member 13.

Figure 4:
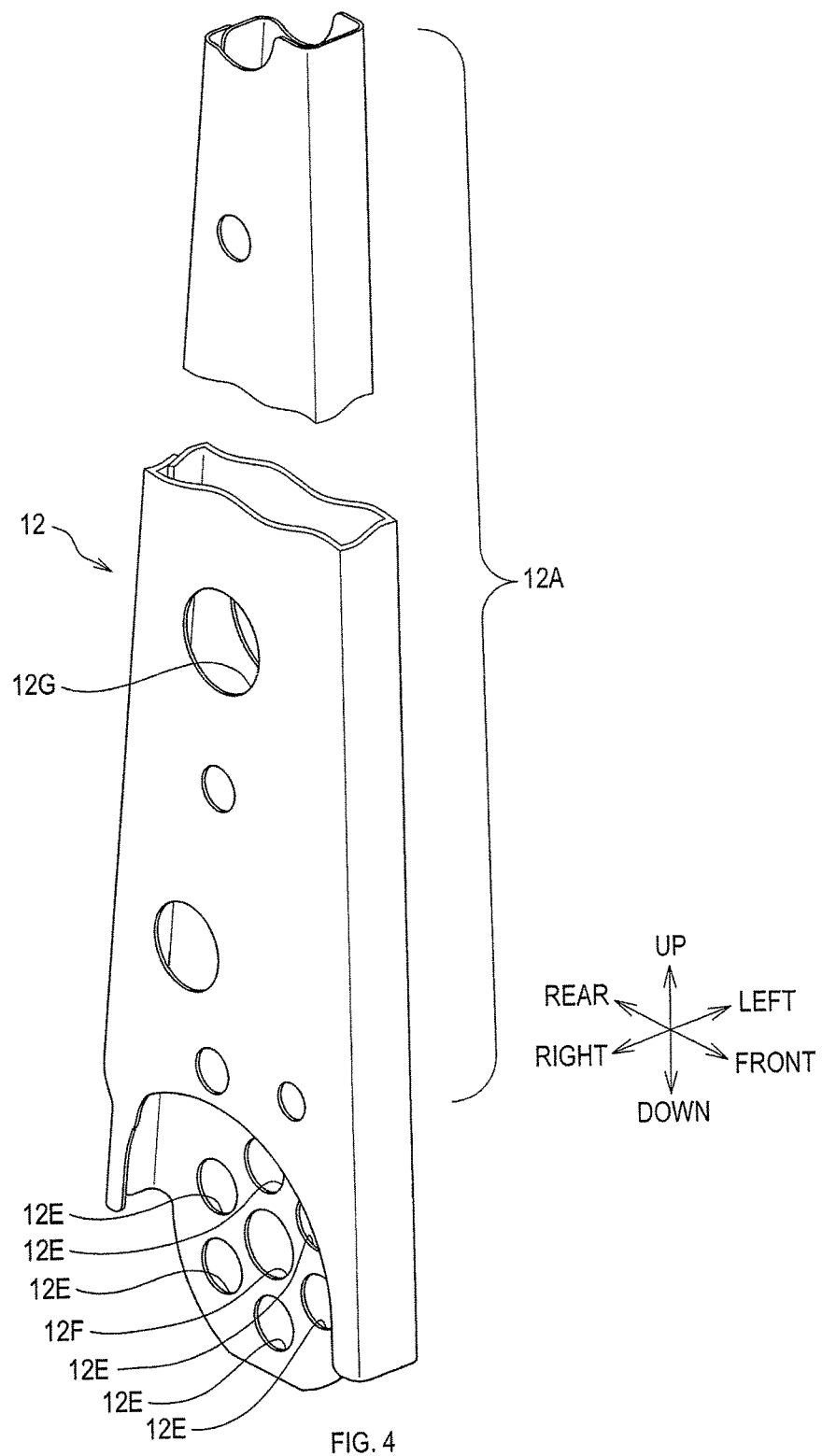
FIG. 4 is a perspective view of a side frame body according to the first embodiment.

FIG. 4 shows that the side frame body 12 is a structural member that extends from the upper end of the center side frame 11 to the center recliner 20 and has a closed cross-section portion 12A.

Figure 7:
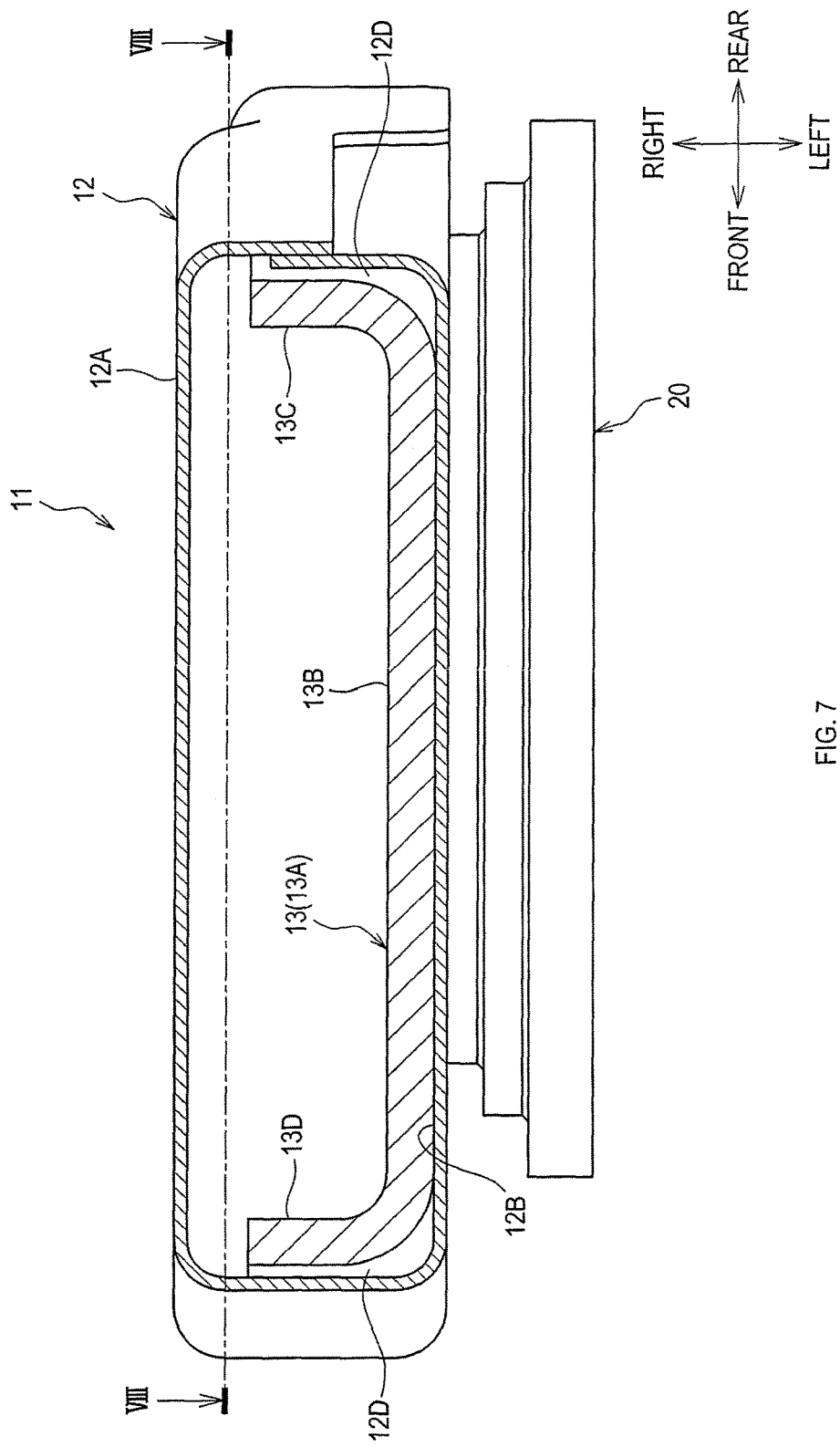
FIG. 7 is a sectional view taken along line VII-VII in FIG. 2.

FIG. 7 shows that the closed cross-section portion 12A according to the present embodiment comprises a substantially rectangular shaped closed cross-section with rounded corners. The closed cross-section portion 12A, thus the side frame body 12, may be formed by bending a single metal plate to have a closed cross-section with overlapping surfaces. The overlapping surfaces of the metal plate may be bonded by welding, riveting, or other bonding methods. Alternatively, edges of the single metal plate may be welded or joined without overlapping surfaces.

Figure 8:
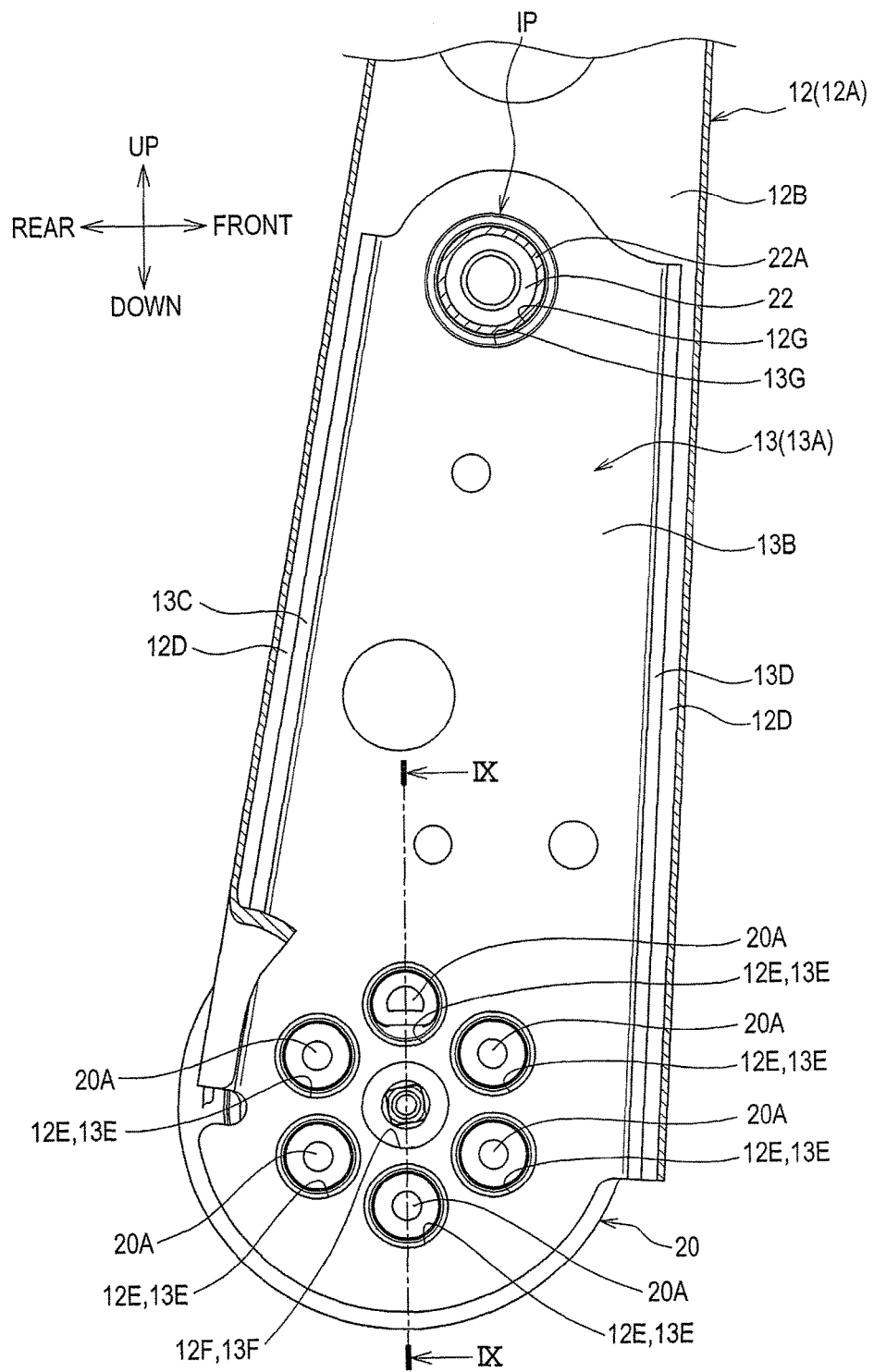
FIG. 8 is a sectional view taken along line VIII-VIII in FIG. 7.

FIG. 8 shows that the reinforcing member 13 extends to the center recliner 20 from a point (hereinafter referred to as the intermediate point IP, see FIG. 8) between the first end (upper end) and the second end (lower end) of the side frame body 12 along the extension axis of the side frame body 12.

Figure 6:
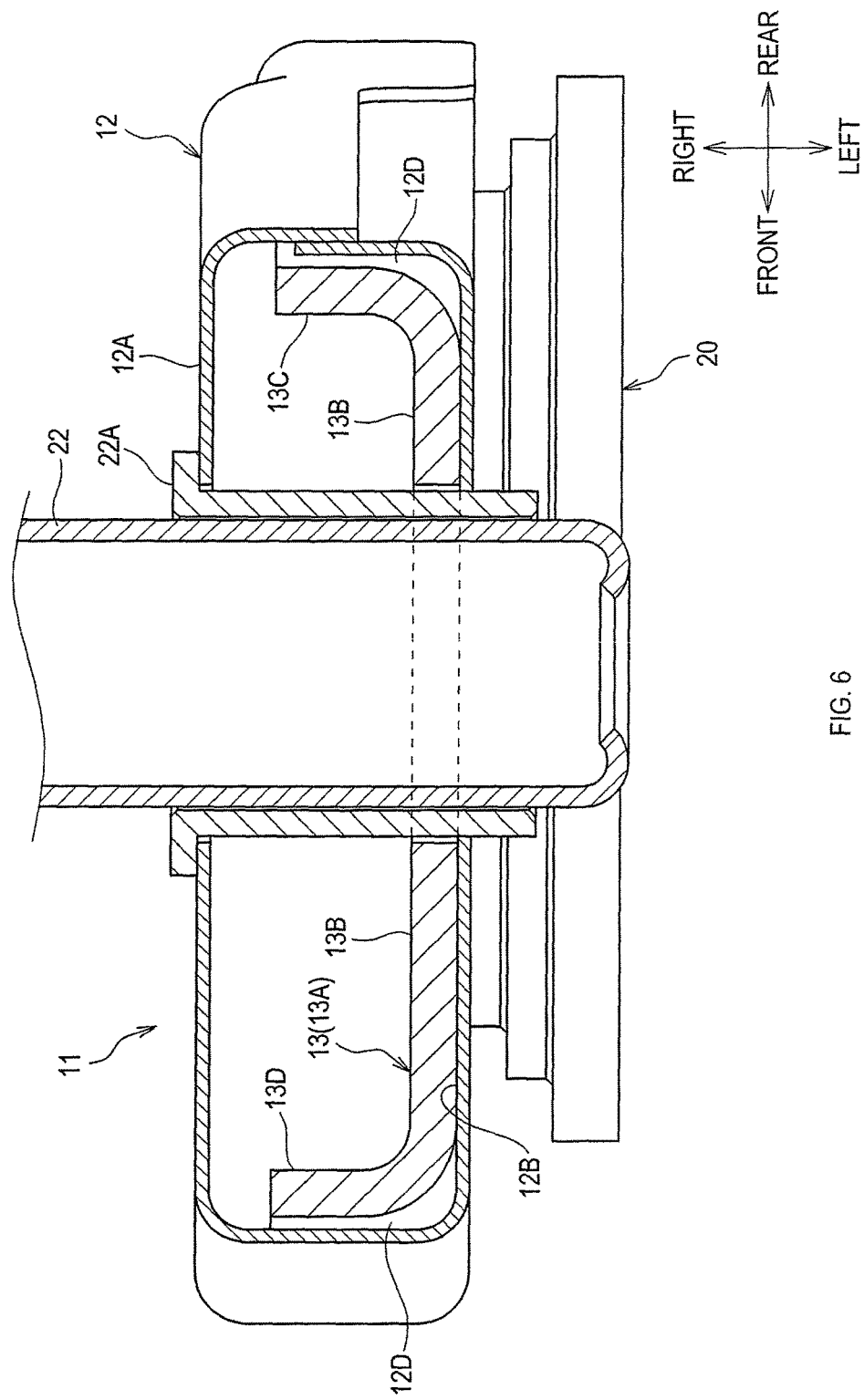
FIG. 6 is a sectional view taken along line VI-VI in FIG. 2.

FIG. 6 shows that the reinforcing member 13 is fixed to the side frame body 12 with at least a part thereof being inserted into the closed cross-section portion 12A. Hereinafter, a part of the reinforcing member 13 that is inserted into the closed cross-section portion 12A is referred to as the insert portion 13A. A plate-face portion of the reinforcing member 13 that is in contact with the face plate portion 12B of the closed cross-section portion 12A is referred to as the contact portion 13B.

Figure 5:
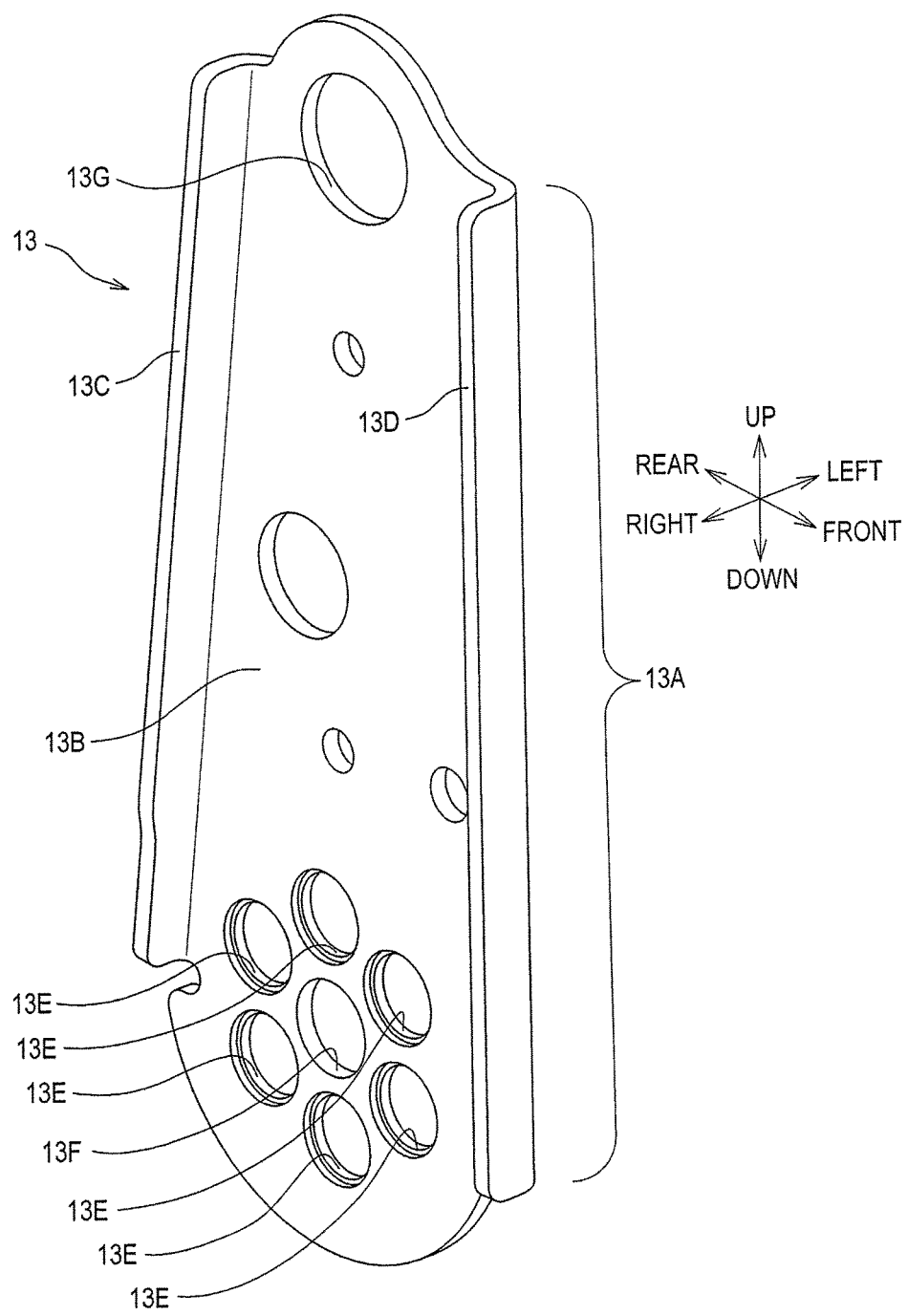
FIG. 5 is a perspective view of a reinforcing member according to the first embodiment.

The reinforcing member 13 may be made from a metal plate whose thickness is greater than the thickness of the side frame body 12. As shown in FIG. 5, the insert portion 13A comprises two flanges 13C and 13D (rear flange 13C and front flange 13D) that each have a shape of a wall and protrude approximately perpendicularly from the contact portion 13B.

The two flanges 13C and 13D are elongated protrusions that extend along the extension axis of the reinforcing member 13 across the entire length of the insert portion 13A. The flanges 13C and 13D are respectively disposed in the rear and the front ends of the contact portion 13B along the width axis of the contact portion 13B. The rear flange 13C is longer than the front flange 13D.

The width axis here is parallel with the plate face of the contact portion 13B and substantially orthogonal to the extension axis of the reinforcing member 13. In the present embodiment, the contact portion 13B and the two flanges 13C and 13D are integrally formed with each other by a method such as press working a single sheet of metal.

FIG. 6 shows that the two flanges 13C and 13D are spaced apart from the face plate portion 12B of the closed cross-section portion 12A, which provides a space 12D between the face plate portion 12B and each of the flanges 13C and 13D.

In other words, the two flanges 13C and 13D are one example of the non-contact portion that is spaced apart from the face plate portion 12B of the closed cross-section portion 12A. The aforementioned space 12D is disposed across each of the areas where the flanges 13C and 13D are disposed, which are along the extension axis of the reinforcing member 13 across the entire length of the insert portion 13A.

2.2 Fixed Structure of Side Frame Body 12 and Reinforcing Member 13

Figure 9:
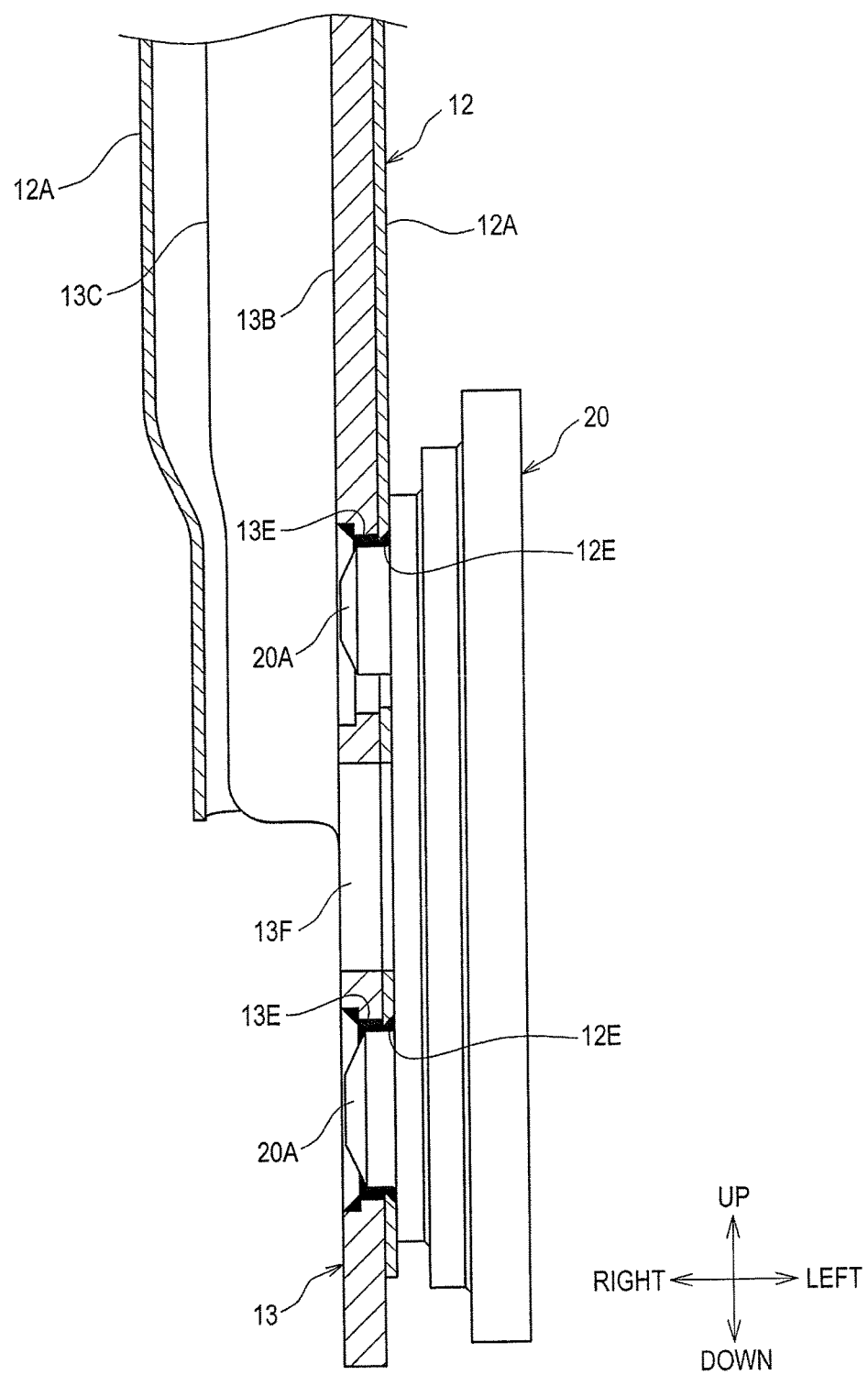
FIG. 9 is a sectional view taken along line IX-IX in FIG. 8.

FIG. 9 shows that the side frame body 12 and the reinforcing member 13 are fixed together in their lower ends where at least the center recliner 20 is attached. In other words, at least three components, the reinforcing member 13, the side frame body 12, and the center recliner 20, are fixed together.

In the present embodiment, the reinforcing member 13, the side frame body 12, and the center recliner 20 are integrated by welding, which is explained more specifically as follows. The center recliner 20 comprises a housing where projecting bosses 20A are disposed. As shown in FIG. 3, the bosses 20A are equally spaced, and arranged in a circle whose center is the center of the pivot motion of the center recliner 20.

The side frame body 12 and the reinforcing member 13 respectively comprises frame off-center through-holes 12E and reinforcing off-center through-holes 13E at their lower ends. Each of the through-holes 12E and 13E is sized to allow the corresponding boss 20A to fit through. As shown in FIG. 9, each boss 20A is fitted through the corresponding through-holes 12E and 13E and integrated with an outer peripheral part and its surrounding area of each of the through-holes 12E and 13E by welding. The top boss 20A may have a smaller diameter than the other bosses (see FIG. 9), or may be D-shaped (see FIG. 3 and FIG. 8).

FIG. 3 shows that frame center through-hole 12F and reinforcing center through-hole 13F that are respectively situated at the center of the circle of arranged through-holes 12E and 12E are provided for a connecting rod (not shown) to pass through. The connecting rod allows the center recliner 20 to interlock with the right recliner 21, FIG. 6 shows that the side frame body 12 and the upper end of the reinforcing member 13 are coupled to each other by the right reinforcing beam 22, which is one example of a beam member. The side frame body 12 thus comprises a frame beam through-hole 12G (see FIG. 4) that allows the right reinforcing beam 22 to pass through. The reinforcing member 13 comprises a reinforcing beam through-hole 13G (see FIG. 5) that allows the right reinforcing beam 22 to pass through.

The right reinforcing beam 22 is disposed through the two beam through-holes 12G and 13G and fixed to the side frame body 12 and the reinforcing member 13 by a fixing method such as welding and swaging. In the present embodiment, as shown in FIG. 6, a cylindrical sleeve 22A is fitted through the two through-holes 12G and 13G, and the right reinforcing beam 22 is inserted through the sleeve 22A.

In the present embodiment, the contact portion 13B of the reinforcing member 13 and the face plate portion 12B of the side frame body 12 are directly bonded with each other by welding at an area between the intermediate point IP and the lower end of the side frame body 12.

3. Features of Vehicle Seat (Particularly, Center Side Frame 11)

In the present embodiment, the side frame body 12 comprises the closed cross-section portion 12A and extends from the upper end of the center side frame 11 to the center recliner 20, and the reinforcing member 13 is fixed to the side frame body 12 with a part thereof being inserted into the closed cross-section portion 12A.

A force acting on the center side frame 11 such as a bending moment is greatest at the lower end of the center side frame 11, which is the root of the center side frame 11, in other words, near the center recliner 20. Therefore, if the required strength near the center recliner 20 can be satisfied, the required strength of the entire center side frame 11 can also be satisfied.

Since the reinforcing member 13 according to the present embodiment extends to the center recliner 20 from the intermediate point IP on the side frame body 12, mass of the center side frame 11 can be reduced without significantly reducing the mechanical strength of the center side frame 11.

To be more specific, the mechanical strength of the center side frame 11 near the center recliner 20 is a combined strength of the side frame body 12 and the reinforcing member 13. In contrast, in a hypothetical structure that needs to satisfy the mechanical strength near the center recliner 20 solely with a reinforcing member, in other words, in a bonded frame that is formed by bonding the reinforcing member with the side frame body 12 at the intermediate point IP of the side frame, the reinforcing member and the side frame body 12 cannot be effectively utilized and thus the mass reduction of the side frame is not easily achieved.

Therefore, the bonded frame needs to satisfy the required strength near the center recliner 20 solely with the reinforcing member. For this reason, the reinforcing member and the side frame body 12 overlap with each other in their bonded area, and thus the mechanical strength at this bonded area becomes greater than required.

Meanwhile, in order to bond strongly, the reinforcing member and the side frame body 12 each need a bonding margin. The mechanical strength at the bonding margins accordingly becomes greater than required. As a consequence, the reinforcing member and the side frame body 12 cannot be effectively utilized; the mass reduction of a side frame is thus not easily achieved.

If the reinforcing member is disposed outside the side frame body in the bonded frame, it is likely to cause a large stress concentration in an area of the side frame body abutting the end of the reinforcing member.

However, if a part of the reinforcing member 13 is inserted into the closed cross-section portion 12A as provided in the present embodiment, an occurrence of a large stress concentration is less likely than in the bonded frame, in which the reinforcing member is disposed outside the side frame body.

As it has been described above, the present embodiment can provide a vehicle seat 1 that can reduce the mass of the center side frame 11 without significantly reducing the mechanical strength of the center side frame 11.

In the present embodiment, the reinforcing member 13, the side frame body 12, and the center recliner 20 are fixed together. That is to say that the reinforcing member 13, the side frame body 12, and the center recliner 20 are fixed together in an area of the center side frame 11, at which a force acting on the center side frame 11 such as a bending moment is greatest, in other words, near the center recliner 20. The mechanical strength of the center side frame 11 can therefore be increased.

The insert portion 13A of the reinforcing member 13 comprises the contact portion 13B that is in contact with the face plate portion 12B of the closed cross-section portion 12A, and two non-contact portions (rear flange 13C and front flange 13D) that are spaced apart from the face plate portion 12B. This configuration can help reduce the mass of the reinforcing member 13.

In a hypothetical configuration where the reinforcing member 13 is fixed on the outside of the side frame body 12, the outer dimensions of the reinforcing member 13 are limited by the outer dimensions of the side frame body 12. It is therefore difficult to reduce the size and thus the mass of the reinforcing member 13.

The insert portion 13A comprises the two flanges 13C and 13D that each have a shape of a wall and protrude from the contact portion 13B. This configuration can help reduce the mass of the reinforcing member 13 and increase rigidity of the reinforcing member 13 at the same time.

The center side frame 11 is attached to the right reinforcing beam 22 that extends along the seat-width axis and passes through the side frame body 12 and the upper end of the reinforcing member 13. This enables the upper end of the reinforcing member 13 to be firmly coupled to the side frame body 12.

Other Embodiments

The reinforcing member 13, the side frame body 12, and the center recliner 20 may be attached with each other by, for example, a mechanical fastener such as a swaged fastener and a bolt.

The closed cross-section portion 12A may comprise a closed cross-section with a rounded outline in a shape of, for example, a circle, an ellipse, or an elongated oval.

In the insert portion 13A of the reinforcing member 13, each of the flanges 13C and 13D, for example, may be in contact with the face plate portion 12B (eliminating most or all of space 12D).

The present disclosure may include, for example, a configuration where the reinforcing member 13 comprises a flange in only one end thereof along the width axis of the contact portion 13B, or comprises no flange 13C nor 13D.

The present disclosure may include, for example, a configuration where the right reinforcing beam 22 is omitted, or where the right reinforcing beam 22 is disposed through the lower ends of the side frame body 12 and reinforcing member 13.

The aforementioned embodiments describe the rear seat of a vehicle. However, utilization of the present disclosure is not limited thereto. For example, the present disclosure may be used for a side frame configured for a vehicle seat (not shown) including a left side seat and a center seat (e.g., a mirror image of FIG. 1); a side frame configured for the side seat 1A; a side frame configured for the center seat 1B; or a side frame configured for a front seat.

The present disclosure is not limited to the aforementioned embodiments as long as it falls within the spirit of the invention described in the claims. Accordingly, the present disclosure may be configured in combination of at least two of the aforementioned embodiments.

What is claimed is:

1. A vehicle seat comprising:
   a back frame that comprises a side frame that extends substantially vertically; and
   a recliner that is coupled to a lower end of the side frame and configured so that the back frame is pivotable,
   the side frame comprising a side frame body, and a reinforcing member;
   the side frame body comprising a closed cross-section portion and extending from an upper end of the side frame to the recliner; and
   the reinforcing member extending to the recliner from a point between a first end and a second end of the side frame body along an extension axis of the side frame body, and the reinforcing member being fixed to the side frame body with at least a part of the reinforcing member being inserted into the closed cross-section portion wherein
   the side frame body and the reinforcing member are fixed together at their respective lower ends such that the side frame body, the reinforcing member and the recliner are fixed together.

2. The vehicle seat according to claim 1, wherein the reinforcing member, the side frame body, and the recliner are fixed together.

3. The vehicle seat according to claim 2, wherein the reinforcing member, the side frame body, and the recliner are integrated by welding.

4. The vehicle seat according to claim 1, wherein an insert portion, which is a part of the reinforcing member that is inserted into the closed cross-section portion, comprises:
   a contact portion that is in contact with a face plate portion of the closed cross-section portion, and
   a non-contact portion that is spaced apart from the face plate portion.

5. The vehicle seat according to claim 1, wherein an insert portion, which is a part of the reinforcing member that is inserted into the closed cross-section portion, comprises:
   a contact portion that is in contact with a face plate portion of the closed cross-section portion, and
   a flange that has a shape of a wall and protrudes from the contact portion.

6. The vehicle seat according to claim 1, further comprising a beam member that extends along a width axis of the vehicle seat and penetrates the side frame body and an upper end of the reinforcing member.

7. A vehicle seat comprising:
   a back frame that comprises a side frame that extends substantially vertically; and
   a recliner that is coupled to a lower end of the side frame and configured so that the back frame is pivotable,
   the side frame comprising a side frame body, and a reinforcing member;
   the side frame body comprising a closed cross-section portion and extending from an upper end of the side frame to the recliner; and
   the reinforcing member extending to the recliner from a point between a first end and a second end of the side frame body along an extension axis of the side frame body, and the reinforcing member being fixed to the side frame body with at least a part of the reinforcing member being inserted into the closed cross-section portion, wherein
   the side frame body and the recliner are directly fixed together.

8. The vehicle seat according to claim 7, wherein the reinforcing member, the side frame body, and the recliner are fixed together.

9. The vehicle seat according to claim 8, wherein the reinforcing member, the side frame body, and the recliner are integrated by welding.

10. The vehicle seat according to claim 7, wherein an insert portion, which is a part of the reinforcing member that is inserted into the closed cross-section portion, comprises:
    a contact portion that is in contact with a face plate portion of the closed cross-section portion, and
    a non-contact portion that is spaced apart from the face plate portion.

11. The vehicle seat according to claim 7, wherein an insert portion, which is a part of the reinforcing member that is inserted into the closed cross-section portion, comprises:
    a contact portion that is in contact with a face plate portion of the closed cross-section portion, and
    a flange that has a shape of a wall and protrudes from the contact portion.

12. The vehicle seat according to claim 7, further comprising a beam member that extends along a width axis of the vehicle seat and penetrates the side frame body and an upper end of the reinforcing member.

* * * * *